June 21, 1938.　　　E. B. HUDSON　　　2,121,665
BUTT WELDING DEVICE FOR METAL STRIPS
Filed April 1, 1936　　　4 Sheets-Sheet 1
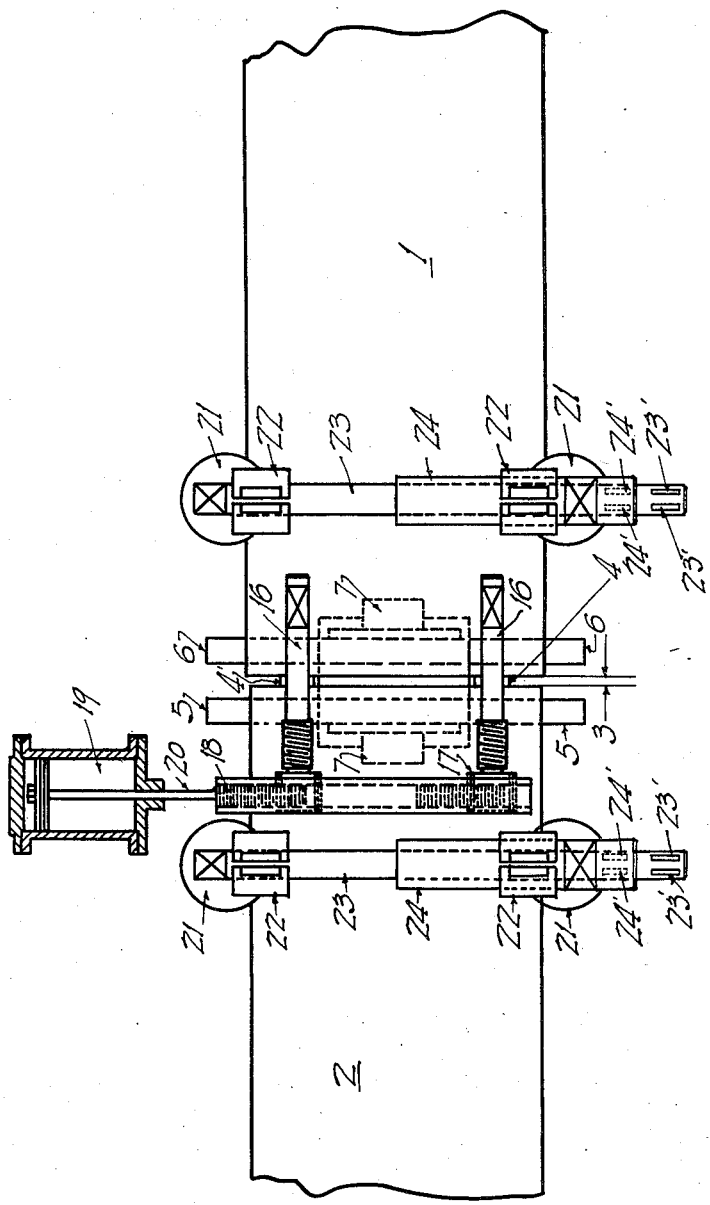
INVENTOR.
EDWIN B. HUDSON.
Allen & Allen
ATTORNEYS.

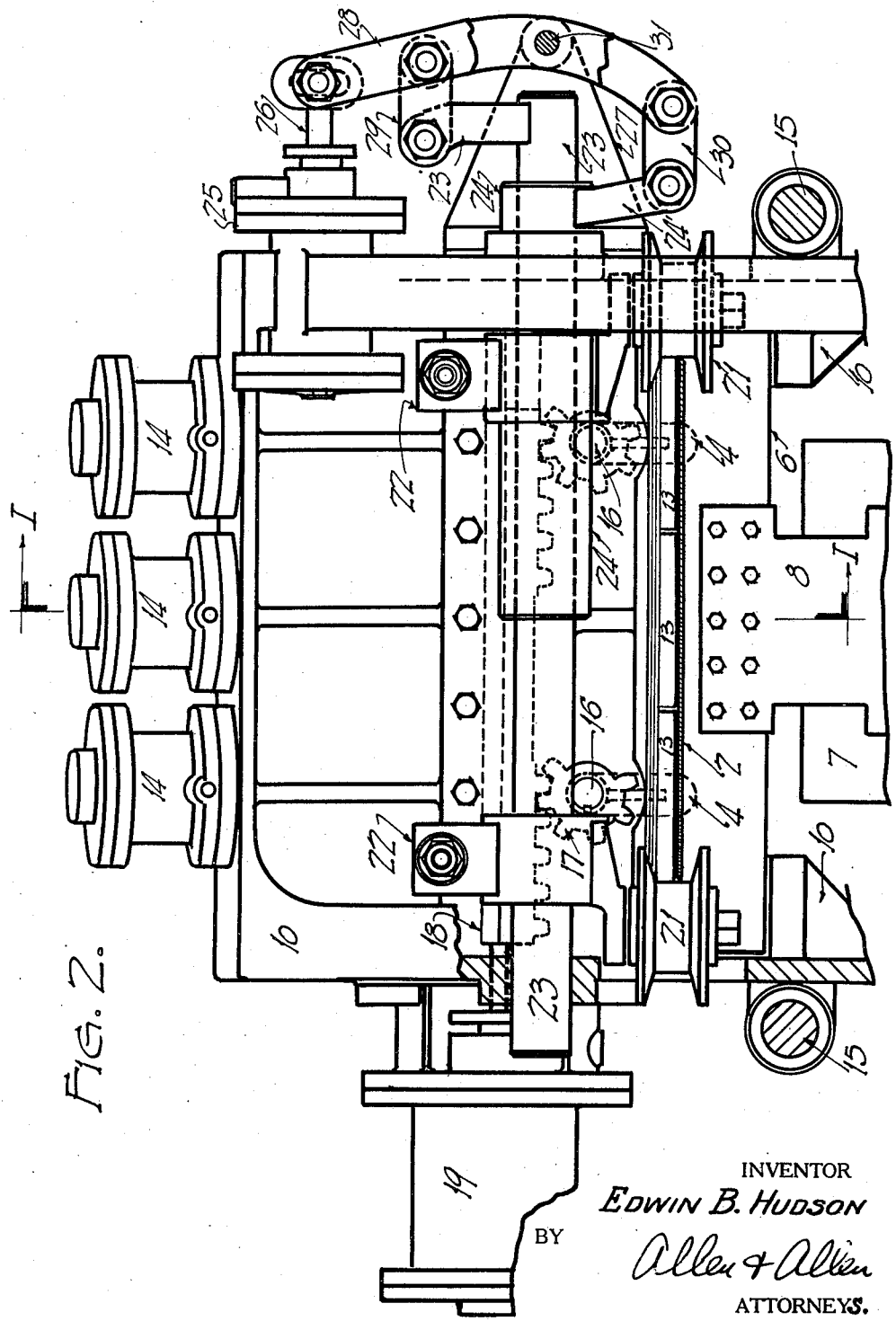

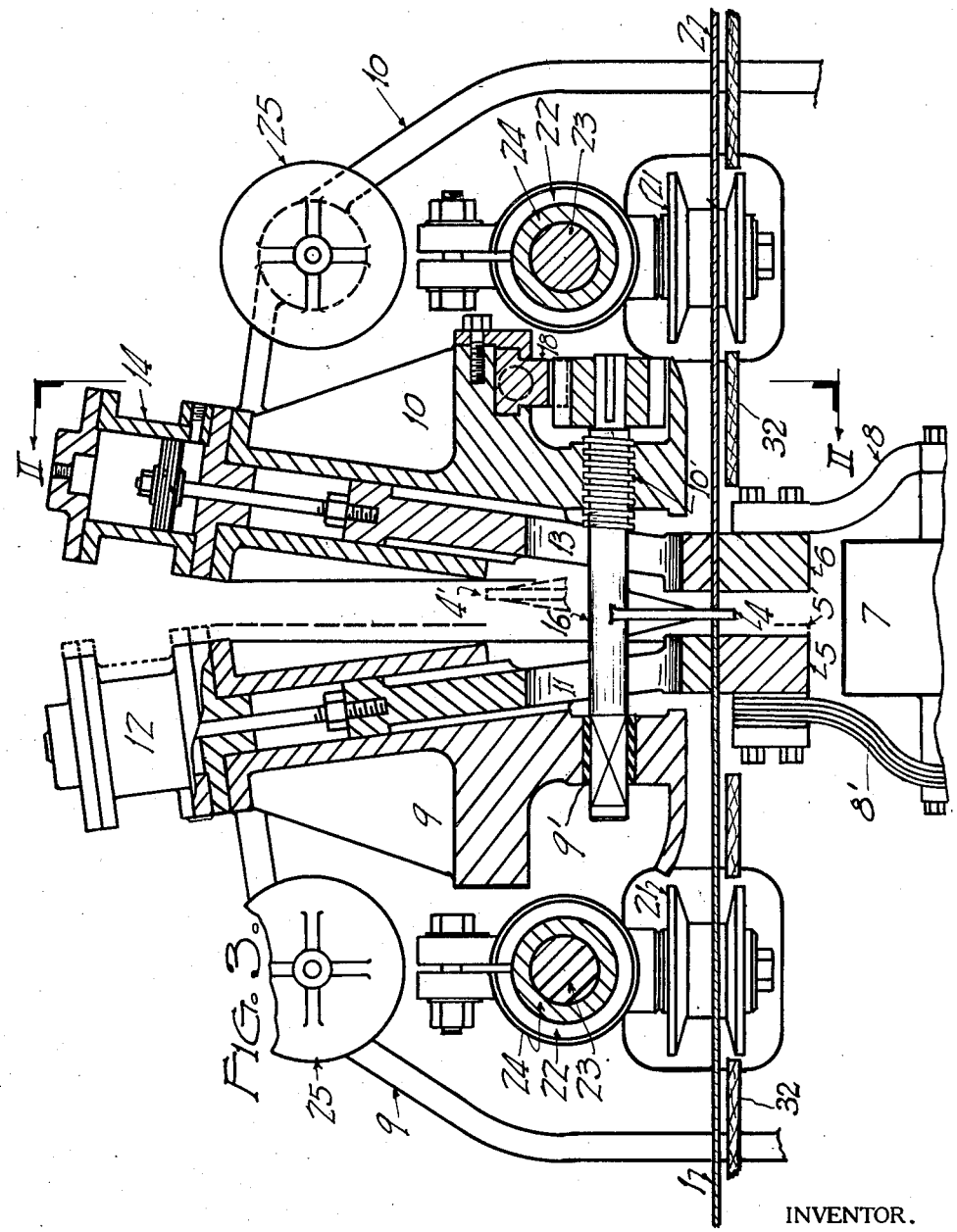

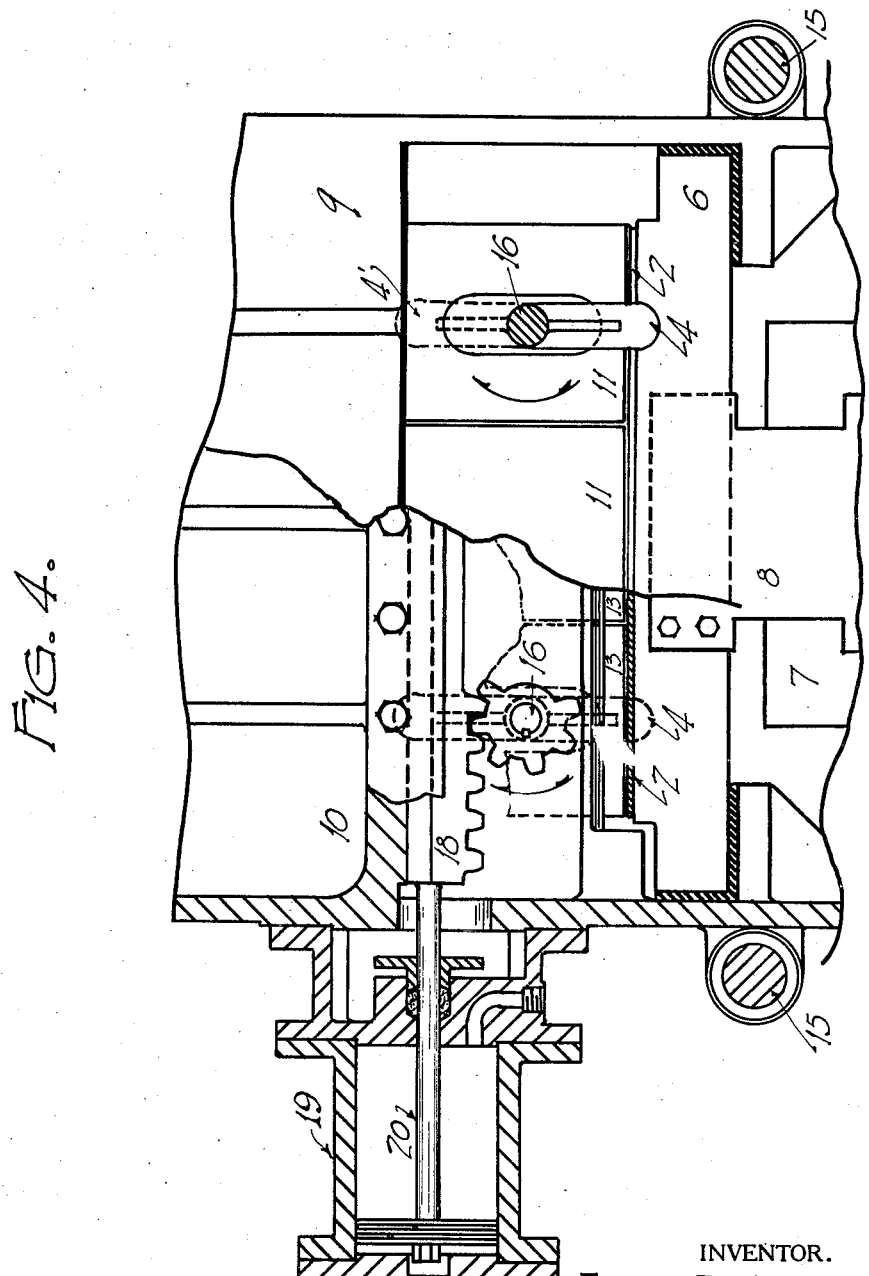

Patented June 21, 1938

2,121,665

UNITED STATES PATENT OFFICE 2,121,665

BUTT WELDING DEVICE FOR METAL STRIPS

Edwin B. Hudson, Middletown, Ohio, assignor to The American Rolling Mill Company, Middletown, Ohio, a corporation of Ohio Application April 1, 1936, Serial No. 72,129

3 Claims. (Cl. 219—4)

My invention relates to mechanism for welding metal strip or sheets to form a larger or a continuous supply thereof for rolling or other operations. I shall describe my invention in an exemplary embodiment having to do with electric butt welding machines particularly adapted for welding commercial hot rolled strip end to end to form much larger coils than are available from the hot strip mills, the coils to be used for further reduction in gauge on a continuous cold reduction mill or on a reversible cold mill, driven or undriven, and having tight coilers or other pulling devices on each side. Long coils, or in some operations, a continuous supply of the metal become desirable in that the mills can be operated at a higher surface speed, and with higher tension in the strip being rolled. With long coils, also, fewer threading operations are required per unit weight of the metal being rolled.

Types of electric butt welding devices now available are capable of welding hot rolled strip or the like end to end satisfactorily for the purpose described, the actual welding taking only from five to twelve seconds. But in the use of these machines a great deal more time is spent in properly positioning the strip ends for welding than in the actual welding operation. It frequently happens that the widths of the ends of the strip are not the same, wherefore it becomes necessary to position the strip ends carefully so that half the excess width of the wide end lies on each side of the narrow end. Again it is necessary to space the ends of the strip at the welding edge a definite distance apart to provide the proper electrical gap for heating, and the proper relation of the welding gap to the push-up stroke of the welder in order to insure the upsetting of the weld.

An object of my invention is to provide means whereby the ends of the strip may be rapidly and accurately positioned in the proper relation to each other immediately before welding. It is therefore an object of my invention to reduce the time required for this operation, which now takes from five to eight times as long as the welding operation itself. A further object of my invention is to provide accurate means for assuring parallelism of the cut ends of the strip to be welded, and an accurate spacing thereof in view of the stroke of the welding machine, as well as rapidly acting means for moving the end gauging means from between the edges when the strips have been clamped, and for insuring that the gauging means do not interfere with the stroke of the welder. Again it is my object to provide side gauging means having the rapid and automatic function of distributing in the proper way any differences in widths of the two strip ends.

These and other objects of my invention, which will be set forth hereinafter or will be apparent to one skilled in the art upon reading these specifications, I accomplish by that certain construction and arrangement of parts of which I shall now describe the aforesaid exemplary embodiment, reference being had to the accompanying drawings, in which:

Figure 1 is a plan view of a welding machine embodying my invention.

Fig. 2 is a partial end and sectional view of the same machine, at the fixed head end.

Fig. 3 is a sectional view at the center line of the machine, the section being taken along the lines 1—1 of Fig. 2.

Fig. 4 is a partial sectional view of the operating mechanism of the end gauger, the section being taken along the lines 11—11 of Fig. 3.

It will be understood, of course, that for the butt welding of sheets or strip the ends will be sheared along straight lines, perpendicular to the axis of the strip or sheet if it is without camber, or if camber is present, along a line that is radial to the camber. This can easily and positively be accomplished by mechanism shown in my copending application for Letters Patent entitled Automatic shear gauges for cambered strip, Serial No. 15,838, filed April 11th, 1935.

In Fig. 1 of the drawings of this case, I have shown the ends of two strips, 1 and 2, which are to be welded together to form a large coil or a continuous supply of metal for further reduction by cold rolling. In this showing, the strip 1 is slightly wider than the strip 2. It is desirable, as has been indicated above that the strips be so aligned that their center lines coincide, and that half the excess width of the wider strip be distributed on each side of the narrower strip, that the distance between the sheared ends of the strip be parallel and a constant distance apart. To these ends, I provide side gauging means which operate simultaneously in from both sides on the edges of the strip, so that strip portions, irrespective of their width, will be aligned with their center lines in coincidence. I also provide end gauging means adapted to extend between the sheared ends of the sheet or strip material to assure parallelism and spacing of the cut ends; and I also provide means for rotating these end gauging devices out of the way after the strip ends have been clamped, and for moving the end gauging means longitudinally of the aligned strips so as not to interfere with the shearing stroke.

It will be understood that in welding machines of the type of the embodiment here described there are two insulated heads or sections mounted upon a suitable base, one at least of the heads being movable toward or away from the other. Provision is made in each head for clamping the end of a strip or sheet. A source of low voltage, high amperage electric current is provided, such as a transformer or generator; and provision is made for connecting the terminals of this source respectively to the sheet ends. Finally, means are provided for moving the sections toward each other so as to bring the ends of the strips or sheets against each other, whereupon welding takes place under the conditions of high heat electrically developed. Since this much is old in the art in machines of this type, my drawings illustrate only such parts of the machines as at present known as are necessary to illustrate the correlation of my novel structure and the operation of my invention.

As shown most clearly in Fig. 3, there is a stationary head or section of the machine indicated generally at 10, and a movable head 9, the movable head being shown in retracted position in the solid lines. I have not shown the mounting of these members, nor the means, usually a fluid cylinder, for producing relative movement, or for shifting the movable member toward the other one for bringing the ends of the strips together during the welding operation. I have, however, shown in Fig. 2 the tie rods 15 with respect to which one or both of the members 9 and 10 are slidably mounted, and from which one or both of the members may be insulated. These rods, or equivalent means, serve to guide the relative movements of the members, and may, if desired, be employed to transmit the moving force to one of them.

Referring again to Fig. 3, each of the members 9 and 10 has an electrode member 5 or 6 fixed thereto, insulated therefrom if desired, and serving also as the lower clamping member for holding the sheet edges. These members may be connected respectively by means of flexible lead members 8 and 8' to the terminals of a transformer 7 or other suitable source of power. The end of the strip 1 is clamped in contact with the electrode 5 by means of a clamp or clamps 11, slidably mounted in the head 9 and actuated by suitable motion and pressure means such as the pressure cylinders 12. In a similar way the strip end 2 is clamped in contact with the electrode 6 by clamp members 13 urged downwardly by the cylinders 14.

For gauging the strip ends so as to maintain parallelism and to insure that the sheared ends are a fixed distance apart, as indicated at 3 in Fig. 1 at the start of the operation, I provide a series of end gauge members 4 adapted to lie between the sheet ends in one position. These members are in the form of arms affixed to shafts 16. When the shafts are rotated, the gauge arms may be brought to a position to lie between the strip ends, or to a position to leave the sheet ends free. These shafts are journaled in a sliding and insulated bearing 9' in the head 9; but are threaded into the head 10 as at 10', so that upon rotation of the shafts 16 the arms 4 not only turn out of a position between the strip ends but also move toward the head 10. The purpose of this is to prevent the arms from interfering, in their upraised position, with the movements of the head 9, which, during the welding operation, is moved as described to occupy the position shown in dotted lines in Fig. 3 as at 5'. For rotation of the several shafts 16 any suitable means may be provided; but I have found it preferable to provide each shaft with a pinion 17, meshing with the teeth of a rack 18 slidably mounted in the head 10. The rack is operatively connected with a fluid cylinder 19 by the piston rod 20 as shown in Figs. 1 and 4. The stroke of the cylinder is such as to rotate the shafts through an angle of 180° so that the stop members 4 can be caused to move from the position shown in solid lines in the several figures to the position shown in dotted lines at 4'.

Means are provided for the sidewise alignment of the strip ends, as the strips are brought to the machine over the table 32. The provision comprises abutment means, preferably rollers 21 attached to movable brackets 22, and means for enforcing equal and opposite movement of each opposite pair of the rollers or abutments with respect to the center line of the table. To this end, in the embodiment shown, the brackets for each pair of rollers are fastened respectively to shafts 23 and 24, the one being tubular, and the other fitting into it as shown most clearly in Fig. 2. Both shafts are movable with respect to their appropriate heads 9 and 10, and means are provided to move the shafts equally in opposite directions. A suitable means, though not the only means which may be employed, as will be clear, comprises a fluid cylinder 25, which, by means of its piston rod 26, moves a lever arm 28 which is pivoted as at 31 to a bracket 27 on the head 10. This lever arm is connected to a bracket 24' on the tubular shaft 24 by a link 30, and to a bracket 23' on the solid shaft 23 by a link 29. The points of connection between the links 29 and 30 are equally spaced on opposite sides of the pivot point 31 of the lever arm 28. Thus as this arm rocks, the shafts and consequently their rollers 21 move equally in opposite directions. The end of a strip inserted between any opposite pair of the rollers 21 will be brought to lie with its center line coinciding with the center line of the table 32, when the rollers 21 are moved against the opposite sides of the strip.

In the operation of my device, when the gauge arms 4 are in the position shown in solid lines, the previously sheared ends of the strips are brought against them over the table 32, so that the ends are brought into parallelism and are spaced apart by the thickness of the arms 4. Next the cylinders 25 are actuated, bringing the rollers 21 or other abutment means against the strip edges, whereby the strip ends are aligned with coinciding median lines and whereby any excess width of a wider strip end is distributed equally on each side of the narrower strip end. The correct positioning of the strip ends has now been speedily and accurately accomplished. The cylinders 14 are next actuated to bring the clamping members against the strip ends to hold them in the heads. Next the cylinder 19 is actuated to cause the gauge arms 14 to swing out of the way. All that remains is the actuation of the heads to bring the strip ends together, apply the current, and effect the weld. By my invention, therefore, the operation of the machine is greatly shortened in time as will be clear.

Modifications may be made in my invention without departing from the spirit thereof.

Having thus described my invention, what I claim as new and desire to secure by Letters Patent, is:

1. In a welding device, a pair of relatively movable heads, clamping means on said heads for holding material to be welded, a shaft journaled in one of said heads, a spacing gauge arm on said shaft and adapted in one position to lie between the ends of said material to be welded, means for rotating said shaft so as to bring said arm away from said first mentioned position, and for moving said gauge laterally to avoid contact with said other head during the welding operation.

2. In a welding device, a pair of relatively movable heads, clamping means on said heads for holding material to be welded, a shaft journaled in one of said heads, a spacing gauge arm on said shaft and adapted in one position to lie between the ends of said material to be welded, means for rotating said shaft so as to bring said arm away from said first mentioned position, said shaft being threaded where journaled in said head, and the bearing being similarly threaded, whereby, when said shaft is rotated, said arm not only rotates, but moves laterally to provide clearance for the relative movement of said heads.

3. In a welding device, a pair of relatively movable heads, each head comprising a lower clamping member serving also as an electrode, upper movable clamping members, means for moving said clamping members into positive contact with sheet-like materials to be welded, a shaft threaded into one of said heads and slidably journaled in the other of said heads, an arm on said shaft adapted in one position thereof to lie between the ends of the material to be welded to space said material prior to clamping, and adapted, upon rotation of said shaft, to move out of said position and also to move laterally to provide clearance for the relative movement of said heads, and means for rotating said shaft.

EDWIN B. HUDSON.